United States Patent [19]
Matz

[11] Patent Number: 6,101,977
[45] Date of Patent: Aug. 15, 2000

[54] PET WATER DISPENSER

[76] Inventor: Lucas Matz, 8010 W. Cathrine, Norwood Park, Ill. 60656

[21] Appl. No.: 09/252,115

[22] Filed: Feb. 18, 1999

[51] Int. Cl.[7] .................................................. A01K 29/00
[52] U.S. Cl. ................................................ 119/74
[58] Field of Search .................................. 119/74, 75, 77, 119/78, 161, 162, 163, 165; 4/252.1–252, 420; D23/297, 298

[56] References Cited

U.S. PATENT DOCUMENTS

| | | | |
|---|---|---|---|
| 2,673,985 | 4/1954 | Gay . | |
| 4,117,555 | 10/1978 | Dennis | 119/1 |
| 4,794,653 | 1/1989 | Strasser | 4/252 |
| 5,003,920 | 4/1991 | Miksitz | 119/163 |
| 5,058,528 | 10/1991 | Counseller et al. | 119/165 |
| 5,458,090 | 10/1995 | Favreau | 119/163 |
| 5,680,710 | 10/1997 | Carnwath | 33/613 |

*Primary Examiner*—Thomas Price

[57] ABSTRACT

A pet water dispenser for dispensing drinking water for an animal. The pet water dispenser includes a base, a bowl portion mounted to the base, and a reservoir mounted to a rear of the base. A pipe has open first and second ends. The first end of the pipe extends into the reservoir. The second end of the pipe opens into the bowl portion. A weighted base is detachably coupled to the base.

18 Claims, 2 Drawing Sheets

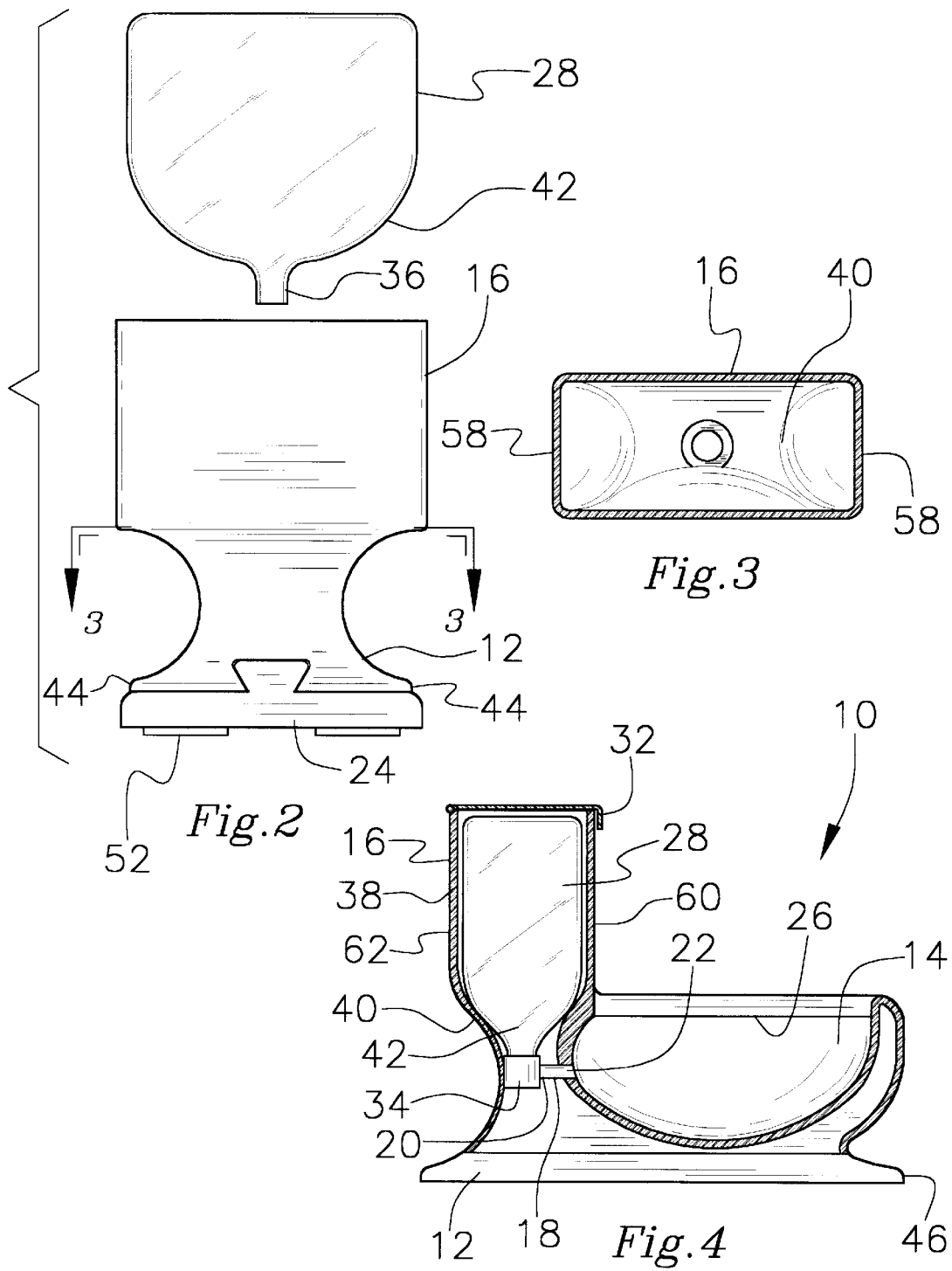

PET WATER DISPENSER

BACKGROUND OF THE INVENTION

1. Field of the Invention

The present invention relates to water dishes and more particularly pertains to a new pet water dispenser for dispensing drinking water for an animal.

2. Description of the Prior Art

The use of water dishes is known in the prior art. More specifically, water dishes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. Des. 392,075; U.S. Pat. No. 3,749,063; U.S. Pat. No. Des. 355,056; U.S. Pat. No. 4,034,715; U.S. Pat. No. Des. 353,229; and U.S. Pat. No. 3,194,426.

While these devices fulfill their respective, particular objectives and requirements, the aforementioned patents do not disclose a new pet water dispenser. The inventive device includes a base, a bowl portion mounted to the base, and a reservoir mounted to a rear of the base. A pipe has open first and second ends. The first end of the pipe extends into the reservoir. The second end of the pipe opens into the bowl portion. A weighted base is detachably coupled to the base.

In these respects, the pet water dispenser according to the present invention substantially departs from the conventional concepts and designs of the prior art, and in so doing provides an apparatus primarily developed for the purpose of dispensing drinking water for an animal.

SUMMARY OF THE INVENTION

In view of the foregoing disadvantages inherent in the known types of water dishes now present in the prior art, the present invention provides a new pet water dispenser construction wherein the same can be utilized for dispensing drinking water for an animal.

The general purpose of the present invention, which will be described subsequently in greater detail, is to provide a new pet water dispenser apparatus and method which has many of the advantages of the water dishes mentioned heretofore and many novel features that result in a new pet water dispenser which is not anticipated, rendered obvious, suggested, or even implied by any of the prior art water dishes, either alone or in any combination thereof.

To attain this, the present invention generally comprises a base, a bowl portion mounted to the base, and a reservoir mounted to a rear of the base. A pipe has open first and second ends. The first end of the pipe extends into the reservoir. The second end of the pipe opens into the bowl portion. A weighted base is detachably coupled to the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet water dispenser apparatus and method which has many of the advantages of the water dishes mentioned heretofore and many novel features that result in a new pet water dispenser which is not anticipated, rendered obvious, suggested, or even implied by any of the prior art water dishes, either alone or in any combination thereof.

It is another object of the present invention to provide a new pet water dispenser which may be easily and efficiently manufactured and marketed.

It is a further object of the present invention to provide a new pet water dispenser which is of a durable and reliable construction.

An even further object of the present invention is to provide a new pet water dispenser which is susceptible of a low cost of manufacture with regard to both materials and labor, and which accordingly is then susceptible of low prices of sale to the consuming public, thereby making such pet water dispenser economically available to the buying public.

Still yet another object of the present invention is to provide a new pet water dispenser which provides in the apparatuses and methods of the prior art some of the advantages thereof, while simultaneously overcoming some of the disadvantages normally associated therewith.

Still another object of the present invention is to provide a new pet water dispenser for dispensing drinking water for an animal.

Yet another object of the present invention is to provide a new pet water dispenser which includes a base, a bowl portion mounted to the base, and a reservoir mounted to a rear of the base. A pipe has open first and second ends. The first end of the pipe extends into the reservoir. The second end of the pipe opens into the bowl portion. A weighted base is detachably coupled to the base.

Still yet another object of the present invention is to provide a new pet water dispenser that has the appearance of a toilet yet is more sanitary to drink out of.

Even still another object of the present invention is to provide a new pet water dispenser that automatically fills with water when the level drops below a predetermined level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic back view of the present invention.

FIG. 3 is a schematic cross sectional view of the present invention taken from line 3—3 of FIG. 2.

FIG. 4 is a schematic cross sectional view of the present invention.

DESCRIPTION OF THE PREFERRED EMBODIMENT

Figure 1:
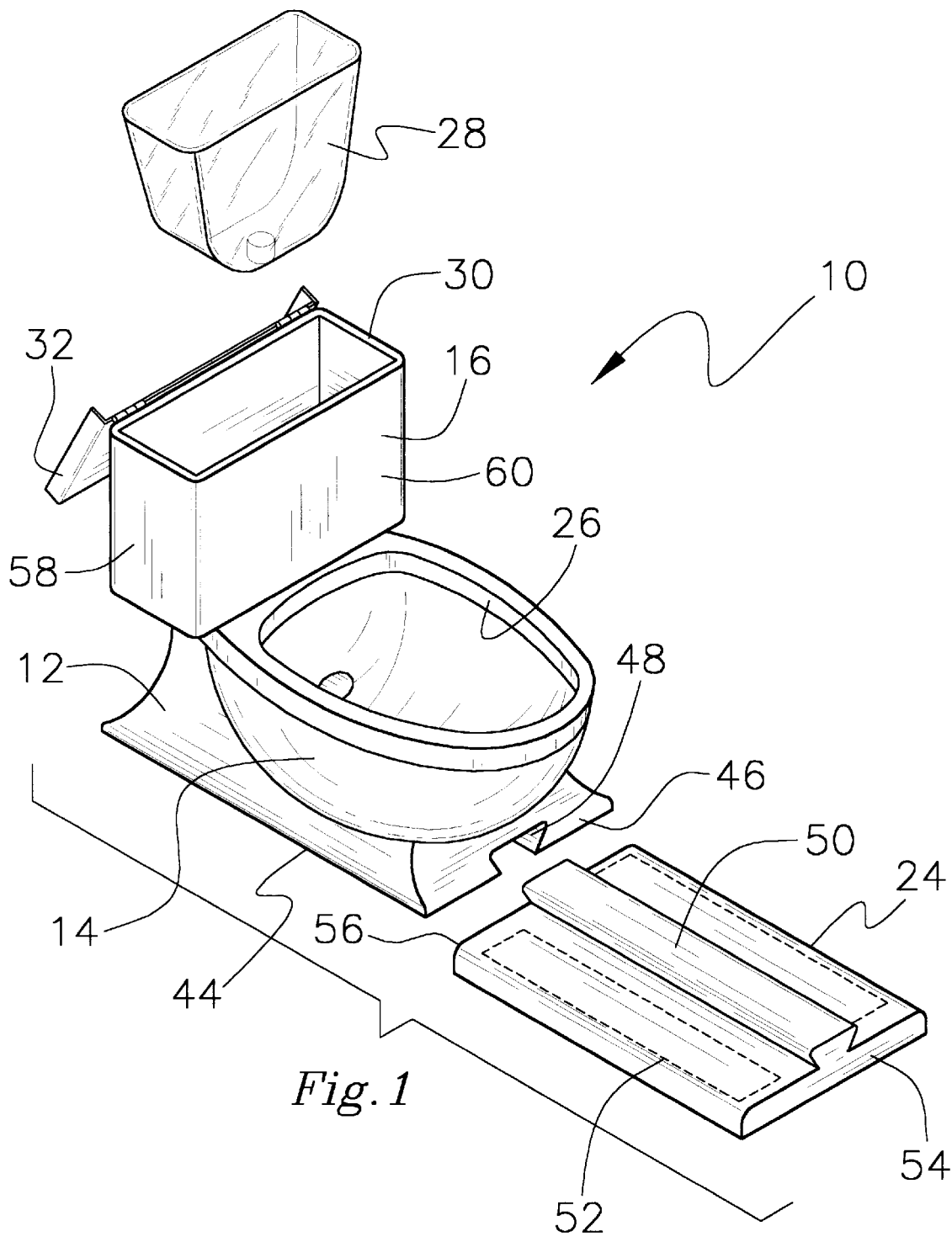
FIG. 1 is a schematic perspective exploded view of a new pet water dispenser according to the present invention.

With reference now to the drawings, and in particular to FIGS. 1 through 4 thereof, a new pet water dispenser embodying the principles and concepts of the present invention and generally designated by the reference numeral 10 will be described.

As best illustrated in FIGS. 1 through 4, the pet water dispenser 10 generally comprises a base 12, a bowl portion 14 mounted to the base, and a reservoir 16 mounted to a rear of the base. A pipe 18 has open first and second ends 20,22. The first end of the pipe extends into the reservoir. The second end of the pipe opens into the bowl portion. A weighted base 24 is detachably coupled to the base.

Preferably, the bowl portion is shaped to resemble a bowl of a toilet. Many animals drink out of the toilet in their master's home, and this device provides a safer, more sanitary alternative to such behavior while giving the animal the sensation of drinking out of a toilet.

Also preferably, the bowl portion has a lip 26 extending around its upper edge that is adapted to help prevent splashing of a fluid out of the bowl portion. Optionally, the bowl portion may have a lid (not shown) that resembles a toilet seat and/or lid to cover the bowl portion to keep it clean, which would be useful when away from home.

Preferably, a container 28 is removably disposable in the reservoir and is adapted to receive a fluid therein. The container is placed in and removed from the reservoir through a top opening 30 of the reservoir. The reservoir has a lid 32 pivotally coupled to it to close the top opening. Ideally, the reservoir is shaped to resemble the reservoir of a toilet Ideally, the first end of the pipe has a neck receiving sleeve 34. The container has an open neck 36 that is insertable in the neck receiving sleeve of the pipe and forms a watertight seal therewith. Water passes through the pipe into the bowl portion. When the water drops to the level of the second end of the pipe, air bubbles pass back through the pipe and into the container to permit more water to be dispensed into the bowl portion.

Preferably, the reservoir has a peripheral sidewall 38 that tapers together towards a bottom end thereof to form a container resting portion 40. The container has a tapered portion 42 that tapers together towards the neck of the container such that the tapered portion rests on the container resting portion of the reservoir so that the weight of the water does not loosen or break the pipe or dislodge the neck receiving sleeve from the reservoir.

Also preferably, the base tapers outwardly in all directions towards its bottom. Ideally, lower side edges 44 and a lower front edge 46 of the base lie on vertical planes that extends tangentially to the upper edge of the bowl portion. This configuration was found to best balance the need for stability with the need to save space. Placing the lower side and front edges out to the outer edge of the container has been found to provide sufficient stability to prevent the whole device from being tipped over under normal conditions.

However, for users who have animals that paw at or climb on the device, the weighted base should be coupled to the base to lower the center of gravity of the device so that it is less likely to tip over and spill.

Ideally, the base has a female dovetail channel 48 extending therealong between the lower front edge and a lower rear edge thereof. The weighted base has a male dovetail 50 extending therealong which is slidably insertable in the channel of the base.

Optionally, the weighted base has a pair of adhesive strips 52 extending along a lower surface thereof for adhesively coupling the weighted base to a surface. The adhesive strips permit the weighted base to be fixedly attached to a surface for maximum stability, while the rest of the device may be removed for cleaning. Adhesive strips with removable tape covering the adhesive are preferred, since water activated strips could become rewetted with use of the device and become disattached.

The preferred length of the weighted base from front 54 to back 56 is between about 18 and 26 inches, ideally about 22 inches. Its preferred width is between about 10 and 18 inches, ideally about 14 inches.

The preferred width of the reservoir between its lateral sides 58 is between about 11 and 19 inches, ideally about 15 inches. The preferred depth of the reservoir from front 60 to back 62 is between about 5 and 9 inches, ideally about 7 inches. The preferred width of the container is between about 12 and 18 inches, ideally about 14 inches. The preferred depth of the reservoir from front to back is between about 4 and 8 inches, ideally about 6 inches.

The preferred height of the device from the bottom of the base (without the weighted base) to the top of the reservoir is between about 14 and 28 inches, ideally about 22 inches.

In use, the container is filled with water or other fluid and placed neck down in the reservoir. The tapering of the container and the reservoir guide the neck into the neck receiving sleeve of the pipe. When the container is empty, it is removed from the reservoir and refilled.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water dispenser, comprising:
   a base;
   a bowl portion mounted to said base;
   a reservoir mounted to a rear of said base and having a top opening;
   a pipe having open first and second ends, said first end of said pipe extending into said reservoir, said second end of said pipe opening into said bowl portion;
   a weighted base being detachably coupled to said base;
   a container being removably disposed in said reservoir, said container being adapted for receiving a fluid therein;
   wherein said first end of said pipe has a neck receiving sleeve, said container having an open neck being insertable in said neck receiving sleeve of said pipe; and
   wherein said reservoir has a peripheral sidewall tapering together towards a bottom end thereof to form a container resting portion, said container having a tapered portion tapering together towards said neck of said container such that said tapered portion rests on said container resting portion of said reservoir.

2. The water dispenser of claim 1, wherein said bowl portion is shaped to resemble a bowl of a tot.

3. The water dispenser of claim 2 wherein said bowl portion has a lip extending around an upper edge thereof adapted for helping prevent splashing of a fluid out of said bowl portion.

4. The water dispenser of claim 1, wherein said base tapers outwardly towards a bottom thereof.

5. The water dispenser of claim 4, wherein lower side edges and a lower front edge of said base lie on vertical planes extending tangentially to an upper edge of said bowl portion.

6. The water dispenser of claim 1, wherein said base has a female dovetail channel extending therealong between said lower front edge and a lower rear edge thereof, said weighted base having a male dovetail extending therealong, said male dovetail of said weighted base being slidably insertable in said channel of said base.

7. The water dispenser of claim 1, wherein said weighted base has a pair of adhesive strips extending along a lower surface thereof for adhesively coupling said weighted base to a surface.

8. The water dispenser of claim 1, further comprising:
   said bowl portion shaped to resemble a bowl of a toilet;
   said bowl portion having a lip extending around an upper edge thereof adapted for helping prevent splashing of a fluid out of said bowl portion;
   said reservoir having a lid pivotally coupled thereto for closing said top opening thereof;
   said base tapering outwardly towards a bottom thereof;
   lower side edges and a lower front edge of said base lying on vertical planes extending tangentially to said upper edge of said bowl portion;
   wherein said base has a female dovetail channel extending therealong between said lower front edge and a lower rear edge thereof, said weighted base having a male dovetail extending therealong, said male dovetail of said weighted base being slidably insertable in said channel of said base; and
   said weighted base having a pair of adhesive strips extending along a lower surface thereof for adhesively coupling said weighted base to a surface.

9. A water dispenser, comprising:
   a base;
   a bowl portion mounted to said base;
   a reservoir mounted to a rear of said base and having a top opening;
   a pipe having open first and second ends, said first end of said pipe extending into said reservoir, said second end of said pipe opening into said bowl portion;
   a weighted base being detachably coupled to said base; and
   wherein said base has a female dovetail channel extending therealong between said lower front edge and a lower rear edge thereof, said weighted base having a male dovetail extending therealong, said male dovetail of said weighted base being slidably insertable in said channel of said base.

10. The water dispenser of claim 9, wherein said bowl portion is shaped to resemble a bowl of a toilet.

11. The water dispenser of claim 10, wherein said bowl portion has a lip extending around an upper edge thereof adapted for helping prevent splashing of a fluid out of said bowl portion.

12. The water dispenser of claim 9, wherein said base tapers outwardly towards a bottom thereof.

13. The water dispenser of claim 12, wherein lower side edges and a lower front edge of said base lie on vertical planes extending tangentially to an upper edge of said bowl portion.

14. A water dispenser, comprising:
   a base;
   a bowl portion mounted to said base;
   a reservoir mounted to a rear of said base and having a top opening;
   a pipe having open first and second ends, said first end of said pipe extending into said reservoir, said second end of said pipe opening into said bowl portion;
   a weighted base being detachably coupled to said base; and
   wherein said weighted base has a pair of adhesive strips extending along a lower surface thereof for adhesively coupling said weighted base to a surface.

15. The water dispenser of claim 14, wherein said bowl portion is shaped to resemble a bowl of a toilet.

16. The water dispenser of claim 15, wherein said bowl portion has a lip extending around an upper edge thereof adapted for helping prevent splashing of a fluid out of said bowl portion.

17. The water dispenser of claim 14, wherein said base tapers outwardly towards a bottom thereof.

18. The water dispenser of claim 17, wherein lower side edges and a lower front edge of said base lie on vertical planes extending tangentially to an upper edge of said bowl portion.

* * * * *